United States Patent [19]
Goetz

[11] Patent Number: 5,220,885
[45] Date of Patent: Jun. 22, 1993

[54] LITTER BOX

[75] Inventor: Charles R. Goetz, Carnegie, Pa.

[73] Assignee: Alco Industries, Inc., Valley Forge, Pa.

[21] Appl. No.: 849,634

[22] Filed: Mar. 5, 1992

Related U.S. Application Data

[63] Continuation of Ser. No. 728,835, Jul. 9, 1991, abandoned, which is a continuation of Ser. No. 528,833, May 24, 1990, abandoned, which is a continuation of Ser. No. 264,219, Oct. 28, 1988, abandoned.

[51] Int. Cl.$^5$ ............................................. A01K 1/00
[52] U.S. Cl. .................................... 119/165; 119/19; 220/4.33
[58] Field of Search ................ 119/17, 15, 19, 165, 119/166, 167, 168, 169, 170; 206/505, 506, 508, 507, 515, 518, 519; 220/4.27, 4.21, 4.24; D30/108, 161

[56] References Cited

U.S. PATENT DOCUMENTS

| | | | |
|---|---|---|---|
| D. 276,752 | 12/1984 | Kinzie | D30/99 |
| D. 286,694 | 11/1986 | O'Rourke | D30/99 |
| D. 300,965 | 5/1989 | Conner | D30/161 |
| D. 300,966 | 5/1989 | Conner | D30/161 |
| D. 300,967 | 5/1989 | Conner | D30/161 |
| D. 300,968 | 5/1989 | Conner | D30/161 |
| D. 319,117 | 8/1991 | Goetz | D30/161 |
| 2,671,573 | 3/1954 | Hendon et al. | 220/681 |
| 2,790,414 | 4/1957 | Rossow | 119/19 |
| 3,027,045 | 3/1962 | Wilson | 206/505 |
| 3,428,026 | 2/1969 | Sohmers et al. | 119/19 |
| 3,482,546 | 12/1969 | Anderson | 119/1 |
| 3,490,417 | 1/1970 | Swinney | 119/19 |
| 3,524,431 | 8/1970 | Graham et al. | 119/19 |
| 3,710,761 | 1/1973 | Gregory | 119/19 |
| 3,752,120 | 8/1973 | Pallesi | 119/1 |
| 3,771,493 | 11/1973 | Chandor | 119/1 |
| 3,771,686 | 11/1973 | Brison | 220/4 R |
| 3,793,989 | 2/1974 | Clark | 119/1 |
| 3,826,229 | 7/1974 | Classe et al. | 119/17 |
| 3,872,832 | 3/1975 | Quinn | 119/1 |
| 3,885,523 | 5/1975 | Coleman | 119/1 |
| 4,111,157 | 9/1978 | Haugen | 119/1 |
| 4,210,100 | 7/1980 | Voss | 119/17 |
| 4,522,150 | 6/1985 | Gershman | 119/1 |
| 4,852,520 | 8/1989 | Goetz | 119/19 |

FOREIGN PATENT DOCUMENTS

| | | | |
|---|---|---|---|
| 2650902 | 5/1978 | Fed. Rep. of Germany | 119/17 |
| 3500498 | 5/1986 | Fed. Rep. of Germany | 119/1 |

OTHER PUBLICATIONS

Doskocil Mfg. Co., Inc., "All-New Kennel Cab II," double-sided page.
Doskocil Mfg. Co., Inc., "Kennel Cab II," one page.
Fred Meyer, "Doskocil Kennel Cab," p. 2 or 4 page flier, May 6–Jun. 2, 1987.
"Pet Taxi," p. 52.
Pet Voyageur, "The Easy Travel Carrier," one page.
Rolf. C. Hagen (U.S.A.) Corp., "Pet Voyageur," 4 page brochure.
Van Ness Plastic Molding Co. Inc., "Van Ness Cat Pans," 6 page brochure.
SPI Products, "Cat Pans Quality Thru Design," brochure cover.
Stylette, "Petmate," one page.
Stylette, "Doskocil, Van Ness," one page.

Primary Examiner—John G. Weiss
Attorney, Agent, or Firm—Webb, Burden, Ziesenheim & Webb

[57] ABSTRACT

A portable litter box for a cat or other domesticated animal comprises a housing having upper and lower sections detachably securable to provide a substantially closed container. The sections are stackable or nestable for storage, shipping and/or display. Preferably, the upper section includes an opening for ingress and egress to the housing and a carrying handle for the box as well as means for holding a freshener; the lower section may include skid resistant feet. Pins are provided for detachably securing the sections together in assembly.

16 Claims, 4 Drawing Sheets

LITTER BOX

This is a continuation of Ser. No. 07/728,835, filed on Jul. 9, 1991, now abandoned, which is a continuation of copending application Ser. No. 07/528,833 filed on May 24, 1990 now abandoned, which is a continuation of Ser. No. 07/264,219 filed Oct. 28, 1988, now abandoned.

BACKGROUND OF THE INVENTION

1. Field of the Invention

This invention relates to litter boxes, particularly portable litter boxes for cats and other domesticated small animals. More particularly, the litter box according to the invention comprises a housing having upper and lower sections which are detachably securable, by pins, to provide a substantially closed container, having an opening providing ingress and egress to the interior of the housing, the sections being stackable or nestable for storage, shipping and/or display. Preferably, the upper section includes an opening providing ingress and egress to the interior of the housing, a the opening carrying handle and means for holding a freshener; the lower section may include skid resistant feet.

2. Brief Description of the Prior Art

Since the domestication of cats, the problem of sanitation and waste collection has been with us. Although paper, cardboard boxes, etc. have been used in this effort, absorbent litter has been widely employed. More recently, plastic containers or boxes have been used to contain the litter, since they may be emptied, cleaned and refilled with litter relatively easily. Moreover, they may be stacked for storage and for display in retail sales outlets.

However, open litter containers or boxes are unsightly and give off unpleasant odors when used. Accordingly, covered plastic boxes have become popular. The problems with these types of boxes are that they are often difficult to assemble, are not easily opened for cleaning, and are not stackable for storage, shipping and/or for display. Since stacked boxes occupy substantially less volume than boxes which are not stackable, it is apparent that freight volume, display shelf space required and cost can be reduced by their use.

SUMMARY OF THE INVENTION

I have invented a portable litter box for a cat or other domesticated animal which comprises a housing having upper and lower sections detachably securable to provide a substantially closed container. The sections are stackable for storage, shipping and/or retail display. Preferably, the upper section includes a carrying handle for the box as well as means for holding a freshener; the lower section may include skid resistant feet. Novel pins are provided for detachably securing the sections together in assembly.

The preferred litter box according to the invention includes upper and lower housing sections made of polyolefin material, such as polypropylene or high density polyethylene However, the material may be any plastic material which is washable.

The components of the box are preferably made by injection molding.

BRIEF DESCRIPTION OF A PRESENTLY PREFERRED EMBODIMENT OF THE INVENTION

Figure 1:
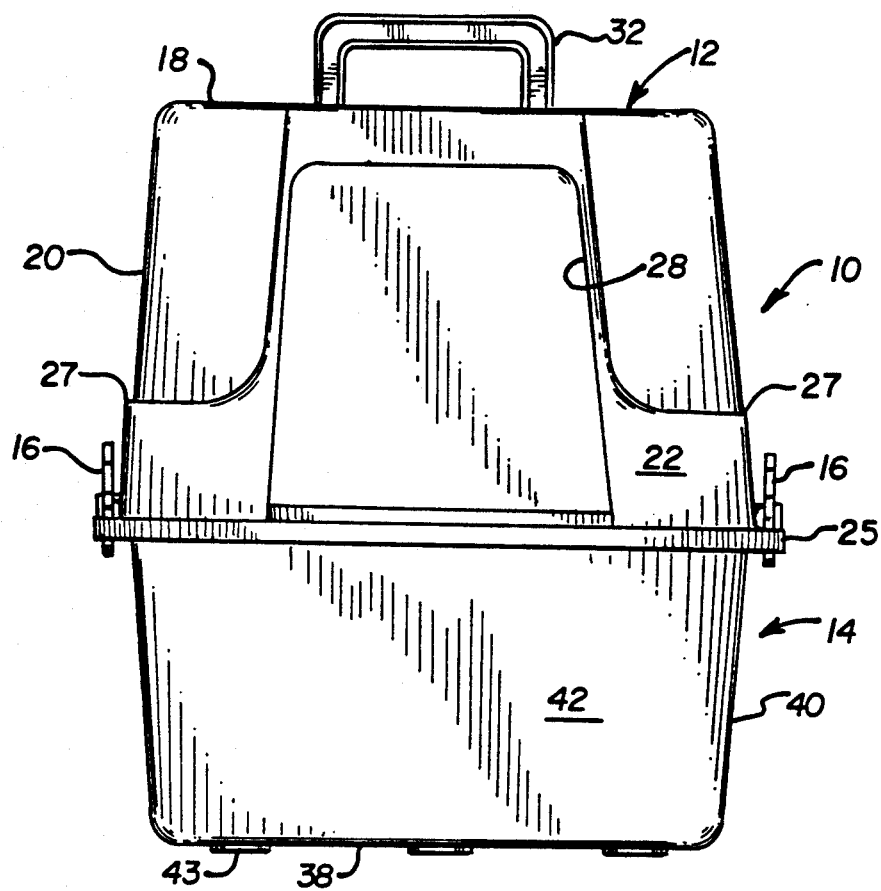
FIG. 1 is an end elevational view of the entrance end into the assembled litter box.
Figure 2:
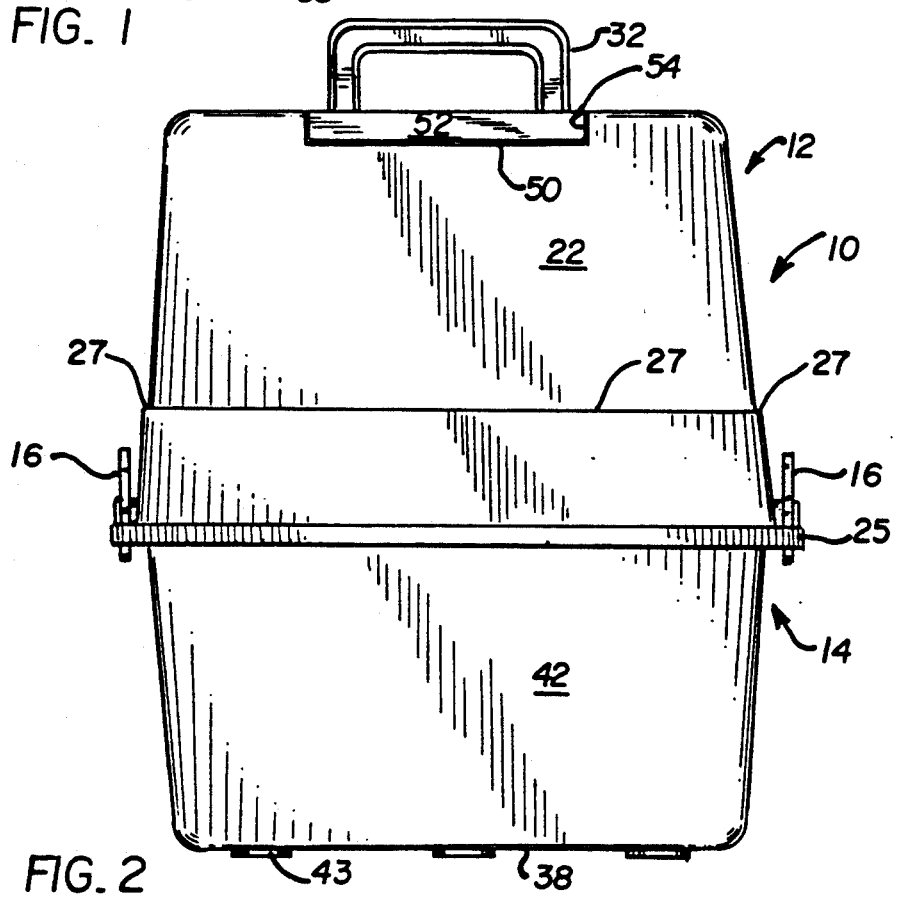
FIG. 2 is an end elevational view of the rear end of the box opposite from that shown in FIG. 1.
Figure 3:
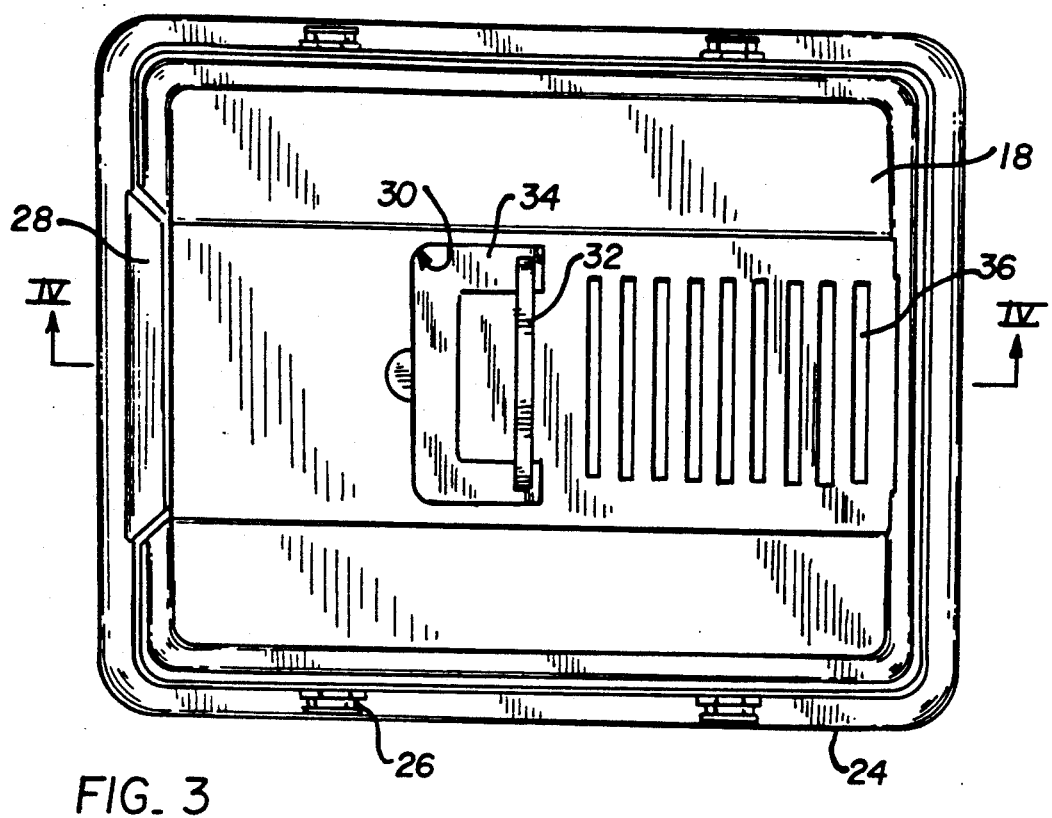
FIG. 3 is a top plan view of the box shown in FIG. 1.

Referring to FIGS. 1-6, a portable litter box for a cat or other domesticated animal comprises a housing 10 having an upper section 12 and a lower section 14. The two sections are adapted to be detachably secured together by a plurality of pins 16 to provide a substantially closed container in the assembled condition.

The upper section 12 includes a substantially planar top wall 18 having a pair of depending outwardly flared side walls 20 and a pair of depending outwardly flared end walls 22. A flange 24 having a lip 25 extends continuously around the perimeter of the section at the edges of the depending walls in a plane substantially parallel, but spaced from, the plane of the top wall 18. A plurality of slots 26 are provided in the flange 24 for receiving pins 16.

An opening 28 is formed in an end wall 22 as shown in FIG. 1 The opening 28 allows ingress and egress, e.g. by a cat, to the interior of the box. A shoulder 27 circumvents the upper section 12 on the side walls 20 and the end wall 22 opposite the end wall having the opening 28. The shoulder 27 is substantially parallel with the flange 24 and spaced therefrom.

A U-shaped recess 30 is also provided in the planar top wall 18 of the box. Handle 32, for carrying the assembled litter box, is pivotally mounted in ends 34 of the recess 30. The handle 32 is shown in its upright position in FIGS. 3 and 4.

A plurality of openings in the form of elongated slots 36 are also provided in the top wall 18. Slots 36 provide ventilation from the exterior to the interior of the box.

The lower section 14 of the housing 10 comprises a bottom wall 38 which is substantially planar. A pair of end walls 40 extend upwardly and outwardly from the perimeter of the bottom wall 38. Similarly, a pair of side walls 42 extend upwardly and outwardly from the bottom wall 38. Preferably, a plurality of non-skid feet 43, made of natural or synthetic rubber material, are provided on the outside of the bottom wall 38.

Figure 4:
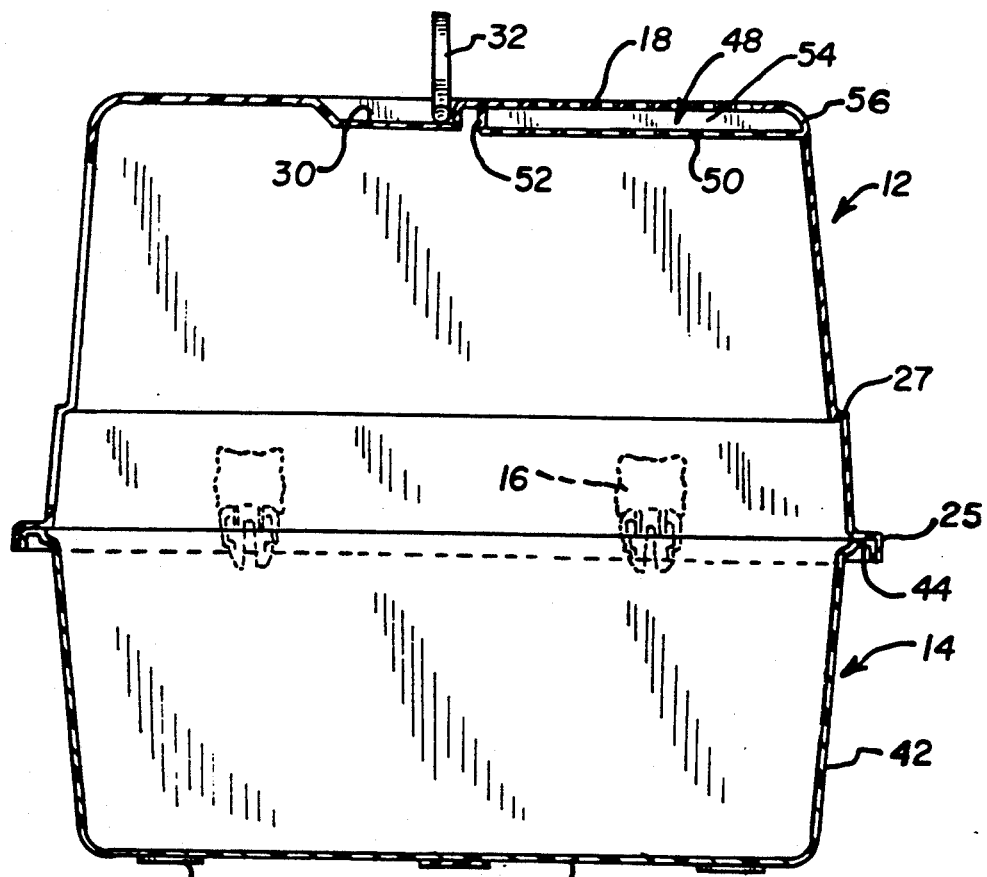
FIG. 4 is a cross-sectional view taken along lines IV—IV of FIG. 3.
Figure 5:
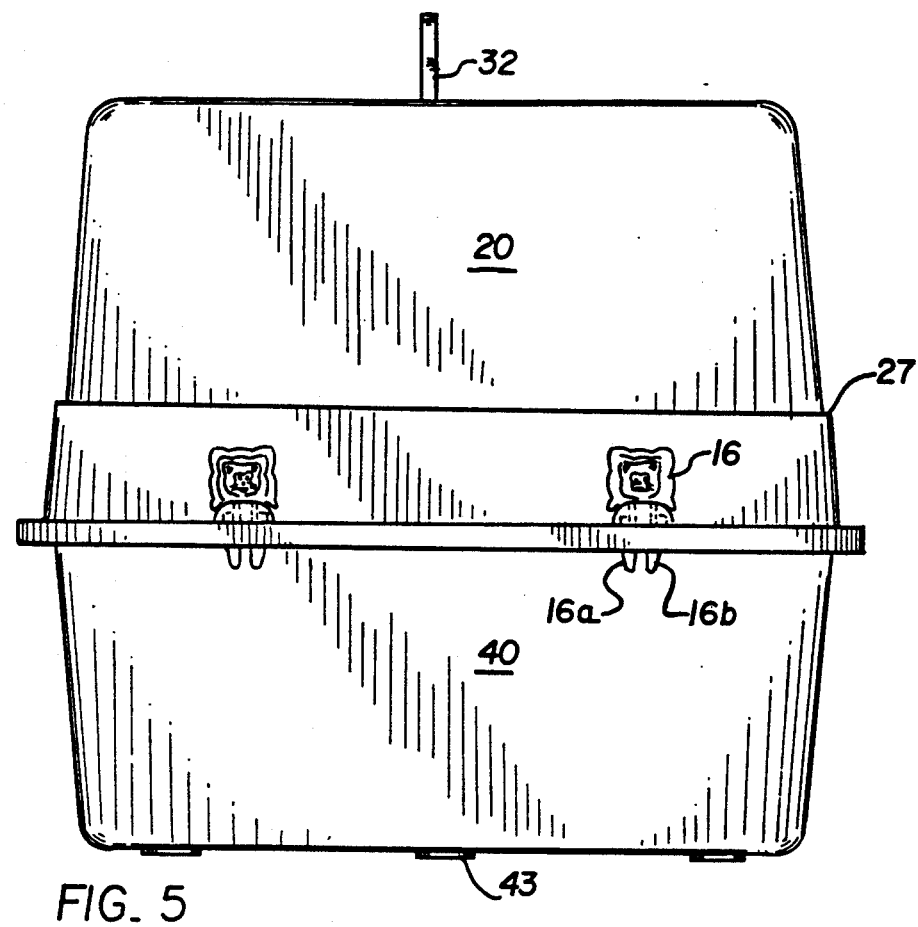
FIG. 5 is a side elevational view of the box of FIG. 1, the opposite side being identical.
Figure 6:
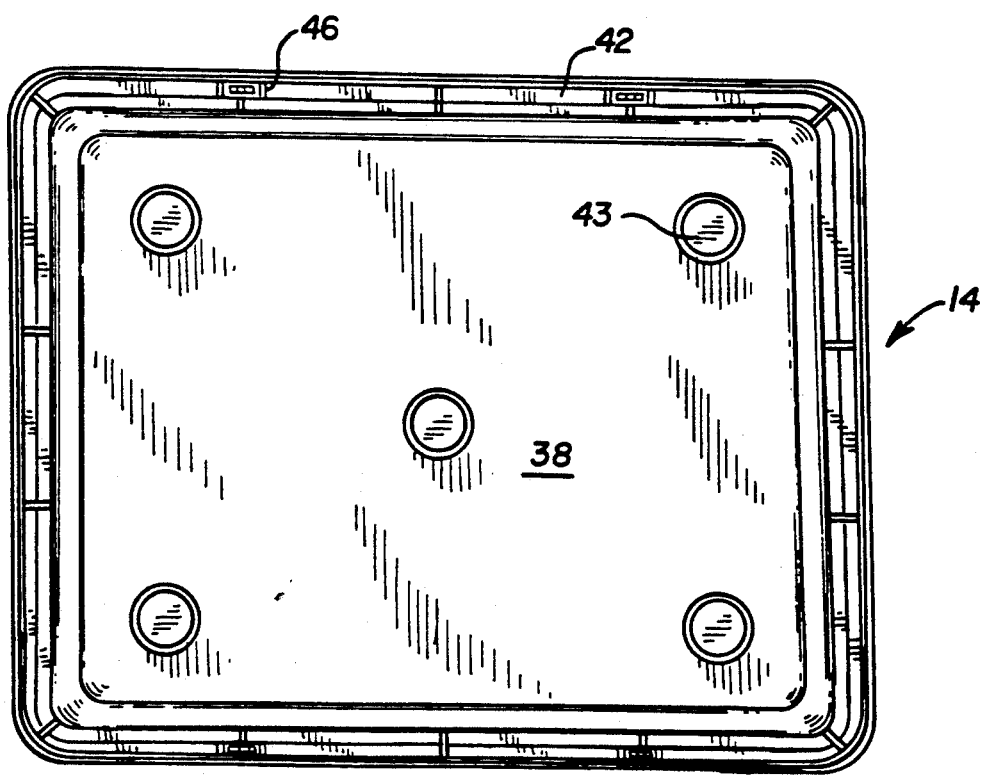
FIG. 6 is a bottom plan view of the box of FIG. 1.

The upper edges of the walls 40 and 42 extend outwardly and then downward continuously forming a lip 44 which is adapted to mate in a complementary relationship with the flange 24 of the upper section 12, as shown in FIG. 4, when the sections are assembled. Slots 46 are also provided in lip 44. The upper lower sections are held in assembly, with slots 26 and 46 in registration, preferably by the pins 16.

Pins 16 include spaced leg portions 16a and 16b, preferably of polyolefin material, which are pliable and adapted to be squeezed together to pass through the slots in the flange 24 and lip 44 to detachably secure the upper and lower sections of the housing 10. A preferred form of pin is shown in Design Application Ser. No. 230,505, filed Aug. 10, 1988.

As shown in FIG. 4, in the preferred embodiment of the invention an elongated compartment 48 having a bottom wall 50, rear wall 52 and side walls 54 is provided for holding a freshener (not shown) for the litter box. Such fresheners are available commercially in the form of disposable packages The freshener is inserted in the compartment from the exterior of the box through an opening 56 in end wall 22 and removed, after use, through the same opening.

Figure 7:
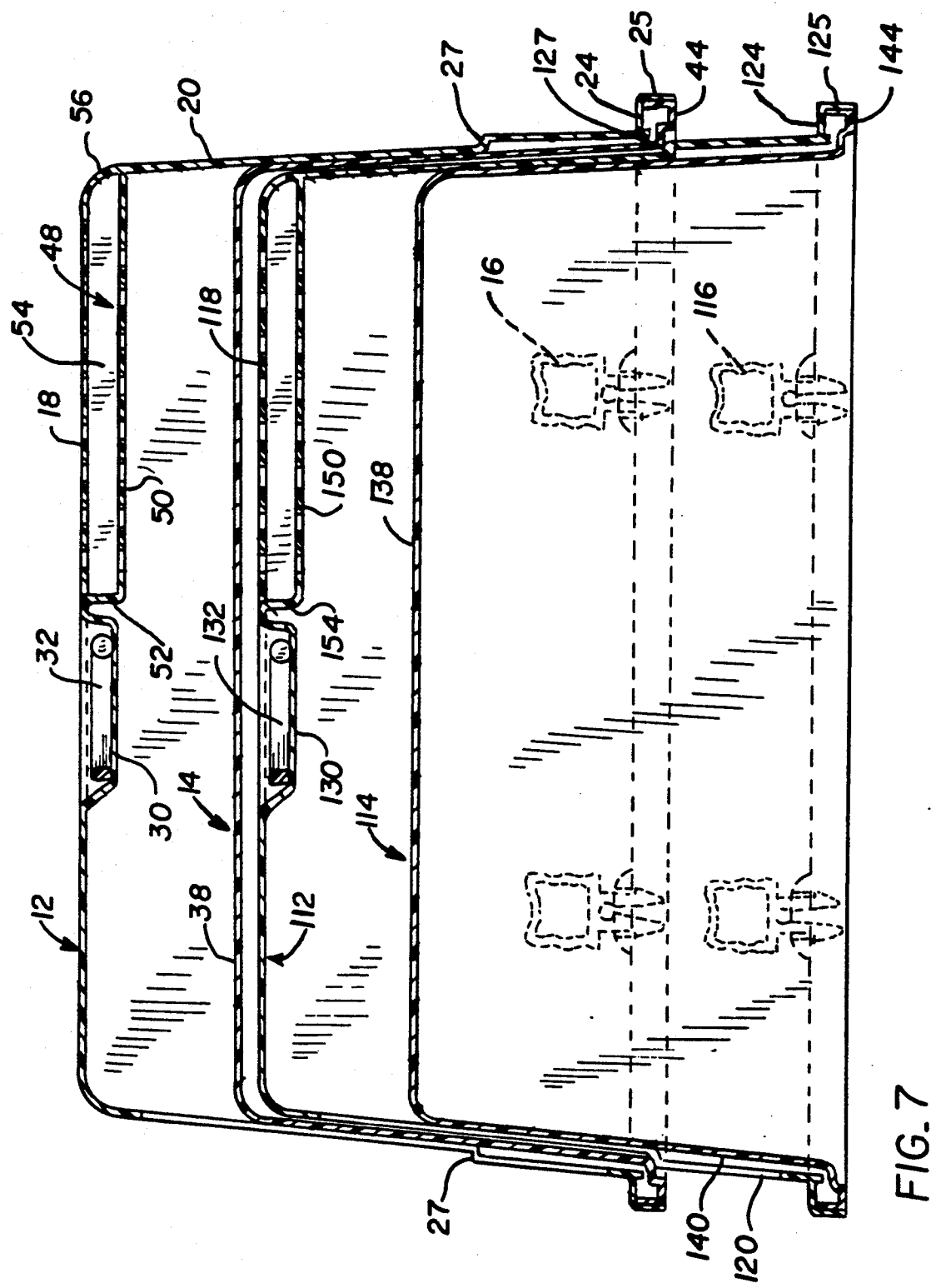
FIG. 7 is a cross-sectional view taken along lines IV—IV (See FIG. 3) of two boxes stacked with their upper and lower portions nested for storage, shipment and/or display.

A significant feature of the present invention is that the upper and lower sections 12, 14 forming the housing 10 can be stacked for storage, shipping and/or retail display. As shown in FIG. 7, a pair of disassembled housings comprise upper sections 12, 112 and lower sections 14, 114 which are nested within one another to provide a compact unit. As shown, upper section 12 is nested with lower section 14 and the upper section 112 of an identical nestable, portable litter box is nested with lower section 14 with the shoulder 27 of the upper section engaging the lip portion 44 of the lower section. Another lower section 114 is then nested with upper section 112 as previously described with reference to upper section 12 and lower section 14. Pins 16, 116 which are used for assembly of sections to one another are partially inserted through the flanges 24, 124 and lips 44, 144 of the sections where they are available for use in assembly. The remaining components of the second housing carry the same numbers as in FIGS. 1-6, preceded by the numeral 1, e.g. 120.

The invention provides a compact unit for storage, shipping and/or retail display. It is easy to assemble and to clean. When the pins are removed, the housing is easily disassembled and the upper and lower sections of the housing may be stacked and stored in a limited space.

Having described a presently preferred embodiment of the invention, it is to be understood that it may be otherwise embodied within the scope of the appended claims.

I claim:

1. A nestable, portable litter box comprising:
   a) a housing having upper and lower sections detachably securable to provide a substantially closed container when assembled, the upper section having an opening providing ingress and egress to the interior of the housing and including a flange having a lower edge and extending continuously about a lower edge thereof and the lower section including a lip portion having a bottom and extending outwardly and downwardly continuously about an upper edge thereof such that the flange on the upper section lies in complementary relationship with the lip portion on the lower section when the sections are assembled;
   b) the lower section being adapted to nest into the upper section in disassembly for storage, shipping and/or display wherein the lip portion of the lower section lies within the flange on the upper section such that the lower edge of the flange and the bottom of the lip portion lie in substantially the same horizontal plane to support the lower section so that the sections are spaced from one another over a substantial part of their extent, the upper section also being adapted to nest into the lower section of an identical nestable, portable litter box and the upper section of an identical nestable, portable litter box also being adapted to nest into the lower section when more than one of such boxes are disassembled and stacked one upon another; and
   c) removable means for securing the flange to the lip in assembly, said means being carried by said flange and lip in disassembly.

2. A nestable, portable litter box comprising:
   a) a housing having upper and lower sections detachably securable to provide a substantially closed container when assembled, the upper section having an opening providing ingress and egress to the interior of the housing and including a flange having a lower edge and extending continuously about a lower edge thereof and the lower section including a lip portion having a bottom and extending outwardly and downwardly continuously about an upper edge thereof such that the flange on the upper section lies in complementary relationship with the lip portion on the lower section when the sections are assembled;
   b) the lower section being adapted to nest into the upper section in disassembly for storage, shipping and/or display wherein the lip portion of the lower section lies within the flange on the upper section such that the lower edge of the flange and the bottom of the lip portion lie in substantially the same horizontal plane to support the lower section so that the sections are spaced from one another over a substantial part of their extent, the upper section also being adapted to nest into the lower section of an identical, nestable, portable litter box and the upper section of an identical, nestable, portable litter box also being adapted to nest into the lower section when more than one of such boxes are disassembled and stacked one upon another; and
   c) removable means for securing the flange to the lip in assembly.

3. A nestable, portable litter box comprising:
   a) a housing having upper and lower sections detachably securable to provide a substantially closed container when assembled, the upper section having an opening providing ingress and egress to the interior of the housing and including a flange having a lower edge and extending continuously about a lower edge thereof and the lower section including a lip portion having a bottom and extending outwardly and downwardly continuously about an upper edge thereof such that the flange on the upper section lies in complementary relationship with the lip portion on the lower section when the sections are assembled;
   b) the lower section being adapted to nest into the upper section in disassembly for storage, shipping and/or display wherein the lip portion of the lower section lies within the flange on the upper section such that the lower edge of the flange and the bottom of the lip portion lie in substantially the same horizontal plane, the upper section being adapted to nest with the lower section of another substantially identical nestable, portable litter box and the upper section of another substantially identical nestable, portable litter box being adapted to nest with the lower section when more than one of such boxes are disassembled and stacked.

4. The litter box as set forth in claim 3 and including means for detachably securing the flange of the upper section to the lip portion of the lower section.

5. The litter box as set forth in claim 4 wherein said means for securing the flange to the lip portion comprises a plurality of openings in the flange aligned with a plurality of openings in the lip portion and a plurality of pins adapted to pass through said openings to secure the upper section of the housing to the lower section of the housing.

6. The litter box as set forth in claim 3 wherein the housing sections are made of polyolefin material.

7. The litter box as set forth in claim 6 wherein the polyolefin material is polypropylene.

8. The litter box as set forth in claim 6 wherein the polyolefin material is polyethylene.

9. The litter box as set forth in claim 3 wherein the housing sections are molded.

10. The litter box as set forth in claim 3 and having skid resistant feet on the exterior of the lower section.

11. The litter box as set forth in claim 3 wherein the upper section of the housing includes a top wall, a recess formed in the top wall and a handle for carrying the box when assembled pivotally mounted to the top wall in the recess.

12. The litter box as set forth in claim 3 wherein the interior of the upper section of the housing includes a compartment for holding a disposable freshener.

13. The litter box as set forth in claim 3 and including an outwardly extending shoulder circumventing the upper section substantially parallel with the flange and spaced therefrom, the shoulder being adapted to engage the lip portion of the lower section when the upper section is nested with the lower section.

14. The litter box as set forth in claim 13 wherein the upper section of the housing includes a top wall, a recess formed in the top wall and a handle for carrying the box when assembled pivotally mounted to the top wall in the recess.

15. The litter box as set forth in claim 13 wherein the interior of the upper section of the housing includes a compartment for holding a disposable freshener.

16. A nestable, portable litter box comprising:
   a) a housing having upper and lower sections detachably securable to provide a substantially closed container when assembled, the upper section having an opening providing ingress and egress to the interior of the housing and including a flange having a lower edge and extending continuously about a lower edge thereof and the lower section including a lip portion having a bottom and extending outwardly and downwardly continuously about an upper edge thereof such that the flange on the upper section lies in complementary relationship with the lip portion on the lower section when the sections are assembled;
   b) the lower section being adapted to nest into the upper section in disassembly for storage, shipping and/or display wherein the lip portion of the lower section lies within the flange on the upper section such that the lower edge of the flange and the bottom of the lip portion lie in substantially the same plane, the upper section being adapted to nest with the lower section of another substantially identical nestable, portable litter box and the upper section of another substantially identical nestable, portable litter box being adapted to nest with the lower section when more than one of such boxes are disassembled and stacked.

* * * * *

UNITED STATES PATENT AND TRADEMARK OFFICE
CERTIFICATE OF CORRECTION

PATENT NO. : 5,220,885

DATED : June 22, 1993

INVENTOR(S) : Charles R. Goetz

It is certified that error appears in the above-identified patent and that said Letters Patent is hereby corrected as shown below:

Item [56]

Cover page, under References Cited, OTHER PUBLICATIONS, "Fred Meyer, "Doskocil Kennel Cab," p. 2 or 4 page flier, May 6-Jun. 2, 1987." should read --Fred Meyer, "Doskocil Kennel Cab," p. 2 of 4 page flier, May 6-Jun. 2, 1987.--
and
"Rolf." should read --Rolf--.

Column 1 Lines 21-22 "includes an opening providing ingress and egress to the interior of the housing, a the opening" should read --includes the opening, a--.

Column 1 Line 33 after "stacked" insert --or nested--.

Column 1 Line 40 after "stackable" insert --or nestable--.

Column 1 Line 51 after "stackable" insert --or nestable--.

Column 1 Line 52 cancel "a" and insert therefor, --an opening providing ingress and egress to the interior of the housing, a--.

Column 1 Line 60 "polyethylene" should read --polyethylene.--.

UNITED STATES PATENT AND TRADEMARK OFFICE
CERTIFICATE OF CORRECTION

PATENT NO. : 5,220,885

DATED : June 22, 1993

INVENTOR(S) : Charles R. Goetz

It is certified that error appears in the above-identified patent and that said Letters Patent is hereby corrected as shown below:

Column 2 Line 57 "downward" should read --downwardly--.

Column 2 Line 61 after "upper" insert --and--.

Column 3 Line 8 "packages" should read --packages.--.

Signed and Sealed this

First Day of February, 1994

Attest:

BRUCE LEHMAN

Attesting Officer

Commissioner of Patents and Trademarks